(12) United States Patent
Manjanatha et al.

(10) Patent No.: US 12,086,158 B2
(45) Date of Patent: Sep. 10, 2024

(54) HYBRID CLOUD ASYNCHRONOUS DATA SYNCHRONIZATION

(71) Applicant: HITACHI VANTARA LLC, Santa Clara, CA (US)

(72) Inventors: Sowmya Manjanatha, Westford, MA (US); Anuj Shroff, Hopkinton, MA (US)

(73) Assignee: HITACHI VANTARA LLC, Santa Clara, CA (US)

(*) Notice: Subject to any disclaimer, the term of this patent is extended or adjusted under 35 U.S.C. 154(b) by 315 days.

(21) Appl. No.: 17/774,500

(22) PCT Filed: Dec. 27, 2019

(86) PCT No.: PCT/US2019/068667
§ 371 (c)(1),
(2) Date: May 5, 2022

(87) PCT Pub. No.: WO2021/133406
PCT Pub. Date: Jul. 1, 2021

(65) Prior Publication Data
US 2022/0391409 A1  Dec. 8, 2022

(51) Int. Cl.
*G06F 16/27* (2019.01)
*G06F 3/06* (2006.01)
(Continued)

(52) U.S. Cl.
CPC ............ *G06F 16/273* (2019.01); *G06F 3/065* (2013.01); *G06F 3/067* (2013.01); *H04L 63/08* (2013.01);
(Continued)

(58) Field of Classification Search
CPC .... G06F 16/273; G06F 3/065; G06F 21/6218; G06F 2221/2141; G06F 3/0617;
(Continued)

(56) References Cited

U.S. PATENT DOCUMENTS 6,470,329 B1   10/2002   Livschitz
8,914,856 B1   12/2014   Velummylum et al.
(Continued)

OTHER PUBLICATIONS

Huber Flores, et al. "A Generic Middleware Framework for Handling Process Intensive Hybrid Cloud Services from Mobiles", In: Proceedings of the 9th International Conference on Advances in Mobile Computing and Multimedia, Dec. 2011.
(Continued)

*Primary Examiner* — Shaqueal D Wade-Wright
(74) *Attorney, Agent, or Firm* — MATTINGLY & MALUR, PC

(57) ABSTRACT

In some examples, a computing device may communicate with a plurality of network storage systems, such as a first network storage system provided by a first service provider employing a first storage protocol and a second network storage system provided by a second service provider employing a second storage protocol different from the first storage protocol. The computing device receives a first object, and determines, for the first object, a first remote bucket at the first network storage system and a second remote bucket at the second network storage system. The computing device may add a synchronization event to a queue for replicating the first object to the first remote bucket and the second remote bucket. Based on consuming the synchronization event from the queue, the computing device replicates data and metadata of the first object to the first remote bucket and the second remote bucket.

15 Claims, 14 Drawing Sheets

(51) Int. Cl.
  *H04L 9/40* (2022.01)
  *H04L 67/1095* (2022.01)
  *G06F 21/62* (2013.01)

(52) U.S. Cl.
  CPC ...... *H04L 67/1095* (2013.01); *G06F 21/6218* (2013.01); *G06F 2221/2141* (2013.01); *H04L 63/101* (2013.01)

(58) Field of Classification Search
  CPC ....... G06F 3/0619; G06F 3/067; H04L 63/08; H04L 67/1095; H04L 63/101; H04L 67/10
  See application file for complete search history.

(56) References Cited

U.S. PATENT DOCUMENTS

| | | | |
|---|---|---|---|
| 2005/0027755 A1 | 2/2005 | Shah et al. | |
| 2009/0282125 A1* | 11/2009 | Jeide | H04L 67/1095 709/217 |
| 2013/0061306 A1 | 3/2013 | Sinn et al. | |
| 2013/0204849 A1 | 8/2013 | Chacko | |
| 2021/0112121 A1* | 4/2021 | Kistner | H04L 67/59 |
| 2023/0413144 A1* | 12/2023 | Song | H04W 48/18 |

OTHER PUBLICATIONS

International Search Report of PCT/US2019/068667 dated Mar. 10, 2020.

\* cited by examiner

\* System Replication Configuration (Enabled by System administrators) \*

```
{
 "ReplicationConfiguration": {
  "Role": "this is a replication rule",
  "Rules": [
   {
    "ID": "Test_id_2",
    "Status": "Enabled",
    "Filter": {
     "Prefix": ""      ← 402
    },
    "Destination": {
     "Account": "",
     "Bucket": "{'action': 'sync-to', 'version': '1.0', 'externalBucket': {'host': 'bucket1.provider1.com', 'type':
PROVIDER1_S3', 'region': 'us-east-2', 'remoteBucketName': 'sync-test', 'accessKey':
'QUtJQVNPS1cyRUkzQVlKSVZMTkY=', 'secretKey':
'bUtOQnUydUZaaFZqQTQ0eGs3M1NaRzZoMUdnVkt2MHpLOEFhOFdmUQ==', 'port': '443', 'authVersion':
'v4', 'usePathStyleAlways': 'true', 'proxyhost': 'proxy.customerdns.com', 'proxyport': '8080'}}"
    }
   }
  ]
 }
}
```

```
*FOR SYNC-FROM (Controlled by application users) *

{
   "version" : "1.0",                              ←502
   "action" : "sync-from",
   "external_bucket" : {
      "type" : "PROVIDER2_S3",
      "host" : "123.23.24.45",
      "port" : "443",
      "region" : "us-west-1",
      "remoteBucketName" : "remoteTestBucket",
      "authVersion" : "V4",
      "usePathStyleAlways" : "true",
      "accessKey" : "111111",
      "secretKey" : "222222"
   }
   "notifications" : {
        "type" : "queueing service",
        "host" : "bucket1.provider2.com",
        "port" : "9000",
        "region" : "us-west-1",
        "queue" : "provider2queue",
        "accessKey" : "111111",
        "secretKey" : "222222"
   }
}

*FOR SYNC-TO*

{
   "version" : "1.0",                              ←504
   "action" : "sync_to",
   "external_bucket" : {
      "type" : "PROVIDER2_S3",
      "host" : "123.23.24.45",
      "port" : "443",
      "region" : "us-west-1",
      "remoteBucketName" : "remoteTestBucket",
      "authVersion" : "V4",
      "usePathStyleAlways" : "true",
      "accessKey" : "111111",
      "secretKey" : "222222"
   }
}
```

FIG. 5

| Version ID | Content Hash | Size (Bytes) | Replication State | Updated Time |
|---|---|---|---|---|
| 000001 | F821589346 | 586358 | Replicated | 1576447997 |
| 001002 | A221789340 | 3850 | Replicated | 1576447998 |
| 003456 | C32168944C | 102456 | Replicated | 1576447999 |
| 038452 | B16980235A | 73890 | Pending | 1576448000 |
| 046892 | F821589346 | 586358 | Link Replicated | 1576448000 |

Local System Object Versions

FIG. 6

| | Network Storage System Object Versions | | | |
|---|---|---|---|---|
| Version ID | Metadata Tag (Content Hash) | Content Size (Bytes) | Storage Size (Bytes) | Timestamp |
| 10000 | F821589346 | 586358 | 586358 | 1576447999 |
| 10001 | A221789340 | 3850 | 3850 | 1576447999 |
| 10002 | C32168944C | 102456 | 102456 | 1576447999 |
| 10010 | F821589346 | 586358 | 0 (link) | 1576448002 |

FIG. 7

HYBRID CLOUD ASYNCHRONOUS DATA SYNCHRONIZATION

TECHNICAL FIELD

This disclosure relates to the technical field of data storage.

BACKGROUND

Synchronizing data across a hybrid cloud system is a recent concept that provides cost management flexibility to storage users, such as by enabling backup and data movement across various different storage services in the cloud. For example, in a hybrid cloud system, the network storage offerings of a variety of different service providing entities may be employed for storing and synchronizing data. However, synchronizing data across a plurality of heterogeneous systems can be challenging because the software stack used in each of these systems may be configured and controlled by different entities, and changes specific to replication may not necessarily function as desired in all of the various different systems.

SUMMARY

Some implementations include a computing device that is able to communicate with a plurality of network storage systems over a network. For instance, a first network storage system may be provided by a first service provider employing a first storage protocol and a second network storage system may be provided by a second service provider employing a second storage protocol that is different from the first storage protocol. The computing device may receive a first object, and may determine, for the first object, a first remote bucket at the first network storage system and a second remote bucket at the second network storage system. The computing device may add a synchronization event to a queue for replicating the first object to the first remote bucket and to the second remote bucket. Based on consuming the synchronization event from the queue, the computing device replicates data and metadata of the first object to the first remote bucket and the second remote bucket.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 is a diagram illustrating an example of pseudocode according to some implementations.

FIG. 5 is a diagram illustrating an example of pseudocode according to some implementations.

FIG. 6 illustrates an example data structure for local system object versions according to some implementations.

FIG. 7 illustrates an example data structure for network storage system object versions according to some implementations.

DESCRIPTION OF THE EMBODIMENTS

Figure 1:
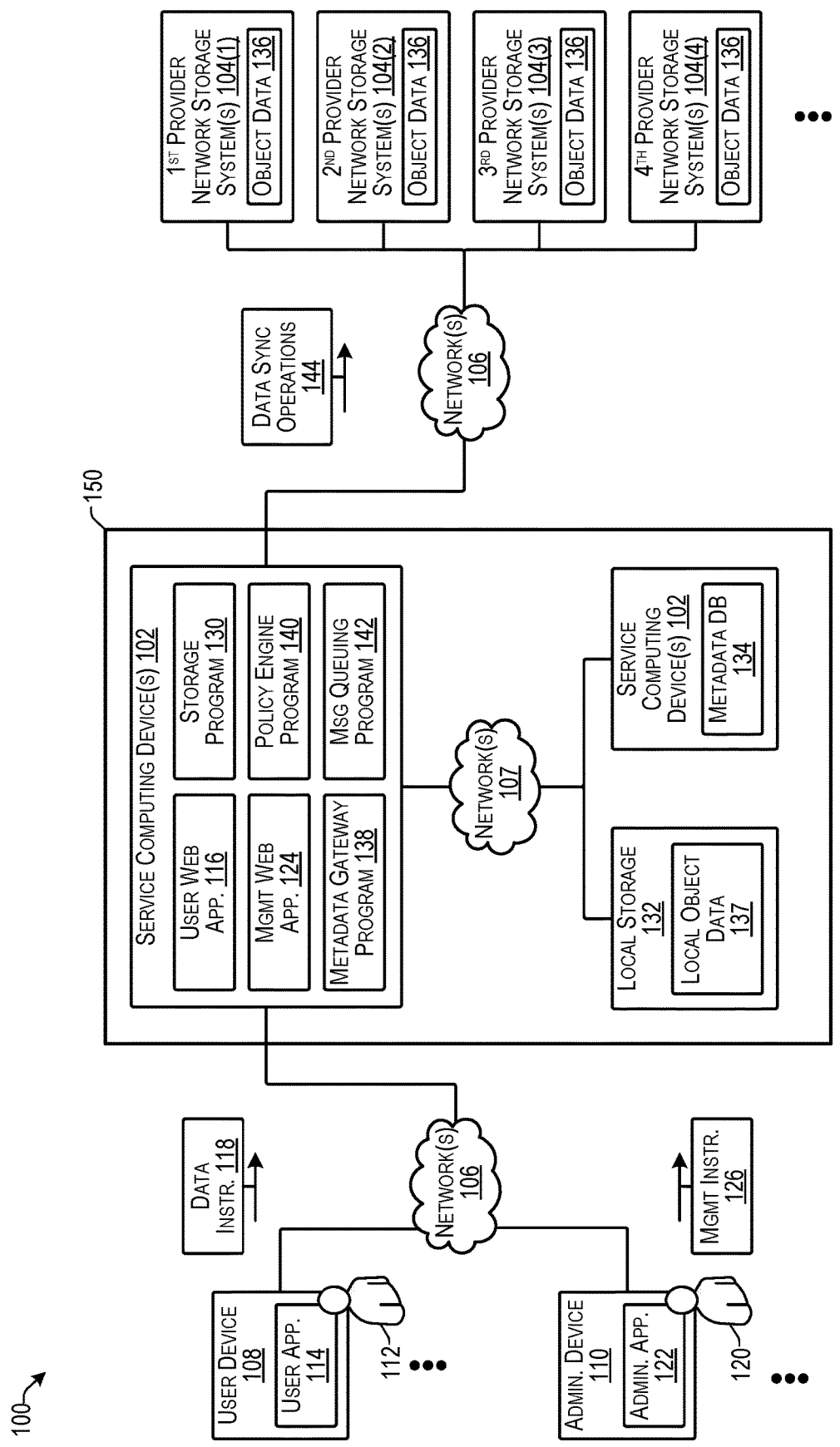
FIG. 1 illustrates an example architecture of a system able to store data and metadata to a plurality of non-homogenous storage systems according to some implementations.

Some implementations herein are directed to techniques and arrangements for a distributed computer system including a hybrid cloud infrastructure able to leverage multiple differently configured network storage systems as targets for synchronizing data, such as for backing up data, replicating data, retrieving data, and so forth. For example, the plurality of heterogeneous network storage systems enable users to leverage the larger range of services offered by a plurality of different cloud storage providers. Implementations herein may support data synchronization targets across a heterogeneous plurality of storage service providers using mechanisms to seamlessly synchronize user data and provide synchronization grouping controls to ensure data security. Thus, implementations herein may support one-to-many synchronization of user data across heterogeneous network-based storage systems that may include commercially available cloud storage, proprietary cloud storage, private wide-area-network storage, local storage, and any combinations thereof.

In addition, to achieve one-to-many heterogeneous synchronization, some examples include the use of one or more open standard application programming interfaces (APIs), such as an S3-based protocol API for replicating data, which may provide a basic replication or data copy mechanism. Nevertheless, conventional APIs leave gaps in efficiency and accuracy of copies. For example, conventional APIs may fail to provide exact metadata copies, which are desirable in addition to exact data copies for several data management purposes. In addition to using basic data copy, some examples herein also employ data versioning and specific event triggers to help ensure accurate metadata updates for maintaining the accuracy of metadata along with related data. In addition, implementations herein may include notification mechanisms for buckets or other containers on the remote end. Furthermore, in some cases, the solution capability may be extended by leveraging different services on all systems to provide an efficient and accurate data management solution.

Some examples herein may support a hybrid architecture including a proprietary local storage system in communication with multiple remote public cloud and/or private cloud storage systems. Furthermore, implementations herein may provide novel approaches for performing multi-way replication across a hybrid cloud system running various different software stacks from various different providers.

To enable synchronizing across multiple different provider systems that do not run the same software stack, some examples herein ensure that all communication is performed using an open standard API. Additionally, the exchange of information may adhere to open standard messaging protocols. Furthermore, in some cases, the multiple different systems may be authenticated separately as not all types of network storage systems allow federation of identity management for all the various types of systems. In addition, some examples herein may limit the amount or frequency of updates to remote systems and may reduce content transfer for optimized performance.

Additionally, different network storage systems may operate at different speeds for receiving, storing and/or providing data, with variable response times. Accordingly, some examples herein may provide extremely granular permission levels or roles to control the communications across the various network storage systems, such as to provide system administrators flexible control to access multiple corporate network domains.

For discussion purposes, some example implementations are described in the environment of one or more service computing devices in communication with a plurality of different network storage systems from different storage providers for managing storage of data and metadata. However, implementations herein are not limited to the particular examples provided, and may be extended to other types of computing system architectures, other types of storage environments, other storage providers, other types of client configurations, other types of data, and so forth, as will be apparent to those of skill in the art in light of the disclosure herein.

FIG. 1 illustrates an example architecture of a system 100 able to store data and metadata to a plurality of non-homogenous storage systems according to some implementations. The system 100 includes a plurality of service computing devices 102 that are able to communicate with, or otherwise coupled to, a plurality of network storage systems, such as a first provider network storage systems 104(1), a second provider network storage systems 104(2), a third provider network storage systems 104(3), a fourth provider network storage systems 104(4), and so forth, such as through one or more networks 106. As mentioned above, each provider of the networks storage systems may be a different entity unrelated to the other providers. Examples of commercial network storage providers include AMAZON WEB SERVICES, MICROSOFT AZURE, GOOGLE CLOUD, IBM CLOUD, and ORACLE CLOUD, to name a few. The network storage systems 104(1)-104(4) may be referred to as "cloud storage" or "cloud-based storage" in some examples, and may enable a lower cost storage solution per gigabyte than local storage that may be available at the service computing devices 102 in some cases. Additionally, in some examples, the storage providers may alternatively be private or otherwise proprietary storage providers such as for providing access only to specific users, entities, or the like, e.g., associated with the service computing devices 102. An example of a proprietary system may include a configuration of HITACHI CONTENT PLATFORM.

Further, the service computing devices 102 are able to communicate over the network(s) 106 with one or more user computing devices 108 and one or more administrator computing devices 110. The user device 108 and the administrator device 110 may be any of various types of computing devices, as discussed additionally below.

In some examples, the service computing devices 102 may include one or more servers that may be embodied in any number of ways. For instance, the programs, other functional components, and at least a portion of data storage of the service computing devices 102 may be implemented on at least one server, such as in a cluster of servers, a server farm, a data center, a cloud-hosted computing service, and so forth, although other computer architectures may additionally or alternatively be used. Additional details of the service computing devices 102 are discussed below with respect to FIG. 14.

The one or more networks 106 may include any suitable network, including a wide area network, such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired connection, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the service computing devices 102, the network storage systems 104, the user devices 108, and the administrative devices 110 are able to communicate over the one or more networks 106 using wired or wireless connections, and combinations thereof.

In addition, the service computing devices 102 may be able to communicate with each other over one or more networks 107. In some cases, the one or more networks 107 may be a LAN, private network, or the like, while in other cases, the one or more networks 107 may include any of the networks 106 discussed above.

The service computing devices 102 may be configured to provide storage and data management services to users 112 via the user devices 110, respectively. As several non-limiting examples, the users 112 may include users performing functions for businesses, enterprises, organizations, governmental entities, academic entities, or the like, and which may include storage of very large quantities of data in some examples. Nevertheless, implementations herein are not limited to any particular use or application for the system 100 and the other systems and arrangements described herein.

Each user device 108 may be any suitable type of computing device such as a desktop, laptop, tablet computing device, mobile device, smart phone, wearable device, terminal, and/or any other type of computing device able to send data over a network. Users 112 may be associated with user devices 108 such as through a respective user account, user login credentials, or the like. Furthermore, the user devices 108 may be able to communicate with the service computing device(s) 102 through the one or more networks 106, through separate networks, or through any other suitable type of communication connection. Numerous other variations will be apparent to those of skill in the art having the benefit of the disclosure herein.

Further, each user device 108 may include a respective instance of a user application 114 that may execute on the user device 108, such as for communicating with a user web application 116 executable on the service computing device(s) 102, such as for sending user data for storage on the network storage systems 104 and/or for receiving stored data from the network storage systems 104 through a data instruction 118 or the like. In some cases, the application 114 may include a browser or may operate through a browser, while in other cases, the application 114 may include any other type of application having communication functionality enabling communication with the user web application 116 over the one or more networks 106.

In some examples of the system 100, the users 112 may store data to, and receive data from, the service computing device(s) 102 that their respective user devices 108 are in communication with. Accordingly, the service computing devices 102 may provide storage for the users 112 and respective user devices 108. During steady state operation there may be users 108 periodically communicating with the service computing devices 102.

In addition, the administrator device 110 may be any suitable type of computing device such as a desktop, laptop, tablet computing device, mobile device, smart phone, wearable device, terminal, and/or any other type of computing device able to send data over a network. Administrators 120 may be associated with administrator devices 110, such as through a respective administrator account, administrator login credentials, or the like. Furthermore, the administrator device 110 may be able to communicate with the service computing device(s) 102 through the one or more networks 106, 107, through separate networks, or through any other suitable type of communication connection.

Further, each administrator device 110 may include a respective instance of an administrator application 122 that may execute on the administrator device 110, such as for communicating with a management web application 124 executable on the service computing device(s) 102, such as for sending management instructions for managing the system 100, as well as for sending management data for storage on the network storage systems 104 and/or for receiving stored management data from the network storage systems 104, such as through a management instruction 126 or the like. In some cases, the administrator application 122 may include a browser or may operate through a browser, while in other cases, the administrator application 122 may include any other type of application having communication functionality enabling communication with the management web application 124 over the one or more networks 106.

The service computing devices 102 may execute a storage program 130, which may provide a gateway to the network storage systems 104, such as for sending data to be stored to the network storage systems 104 and for retrieving requested data from the network storage systems 104 or from local storage 132. In addition, the storage program 130 may manage the data stored by the system 100, such as for managing data retention periods, data protection levels, data replication, and so forth.

The service computing devices 102 may further include a metadata database (DB) 134, which may be divided into a plurality of metadata DB portions, such as partitions, and which may be distributed across a plurality of the service computing devices 102. For example, the metadata DB 134 may be used for managing object data 136 stored at the network storage systems 104 and local object data 137 stored at the local storage 132. The metadata DB 134 may include numerous metadata about the object data 136, such as information about individual objects, how to access the individual objects, storage protection levels for the objects, storage retention periods, object owner information, object size, object type, and so forth. Further, a metadata gateway program 138 may manage and maintain the metadata DB 134 such as for updating the metadata DB 134 as new objects are stored, old objects are deleted, objects are migrated, and the like, as well as responding to requests for accessing data.

In addition, the service computing device(s) 102 may include a policy engine program 140 that may be executed to perform data synchronization with the network storage systems 104(1)-104(4). In some cases, the policy engine program 140 may be a module of the storage program 130, while in other cases, the policy engine program 140 may be a separate program. In some cases, the policy engine program 140 may operate in cooperation with a message queueing program 142 for synching the object data 136 with the network storage systems 104. Examples of message queuing programs that may be used in some examples herein include open source multi-protocol message brokers such as RABBITMQ and ACTIVEMQ.

Furthermore, the policy engine program 140 may synchronize the object data 136 asynchronously with the network storage systems 104. For example, rather than having to perform certain storage operations to the network storage systems 104 and complete the operations before reporting back to a user, the storage program 130 may store the object data to the local storage 132 as local object data 137, may add metadata for the object to the local metadata database 132, and my reply to the requesting device with a completion message, or the like. The storage program 130 may subsequently send the data to a queue to subsequently asynchronously synchronize the data with one or more of the network storage systems 104 via one or more data synchronization operations 144.

Implementations herein may divide the synchronization process into two parts comprising a sync-to procedure that synchronizes data to the network storage systems 104 and a sync-from procedure that synchronizes data back from the network storage systems 104. This approach has several advantages, such as providing a great amount of flexibility for operators (e.g., users 112 and/or administrators 120) to control the level of replication and further providing the ability to prevent formation of loops. For example, the system is able to provide validation within the system to verify, e.g., at the time of setup, that an operator is not creating a ring or a topology that forms a loop causing infinite replication that would then require additional intervention to prevent system instability.

In the system 100, event driven synchronization is employed that is guided by the policy engine program 140, which is configured to apply actions such as rate control limiting and/or quality of service management to ensure that the speed of data synchronization is able to be managed by administrators. Furthermore, some examples may employ versioning for data, e.g., each update may result in a different version that can subsequently help to provide an ordering of the object data 136 on the network storage systems 104. For instance, each of the network storage systems 104 may utilize a different versioning scheme, so maintaining an ordering of the object data 136 may be difficult using the provider tools. However, providing versioning capability via the policy engine program 140, enables operators/applications the ability to compare and eliminate version conflicts by either manually deleting certain versions or subsequently updating versions with correct content.

Furthermore, in some examples the user metadata for each version of a data object may be synchronized along with object data, which can enable the applications to add any specific information desirable for further data management. As one example, this feature enables the maintenance of an audit trail of the applications/operators that generated the data. For example, a metadata tag may include information about the originating source or originating application, as well as the time the application created the data, which can be then be used along with data versions to enable re-ordering of the versions based on the timestamp included in the metadata for that object.

In addition, some examples herein allow the setup of bucket level filters that may be applied, e.g., to enable synchronization of only a subset of stored data, such as may be specified by the operator. The synchronization herein can also function without filters as well, but filters may provide an additional level of flexibility to limit the amount of data being replicated.

In some cases, the service computing devices 102 may be arranged into one or more groups, clusters, systems, or the like, e.g., at a site 150. For instance, a plurality of sites 150 may be geographically dispersed from each other such as for providing data replication, disaster recovery protection, or the like. Further, in some cases, the service computing devices 102 at a plurality of different sites 150 may be configured for securely communicating with each other, such as for providing a federation of a plurality of sites 150.

Figure 2:
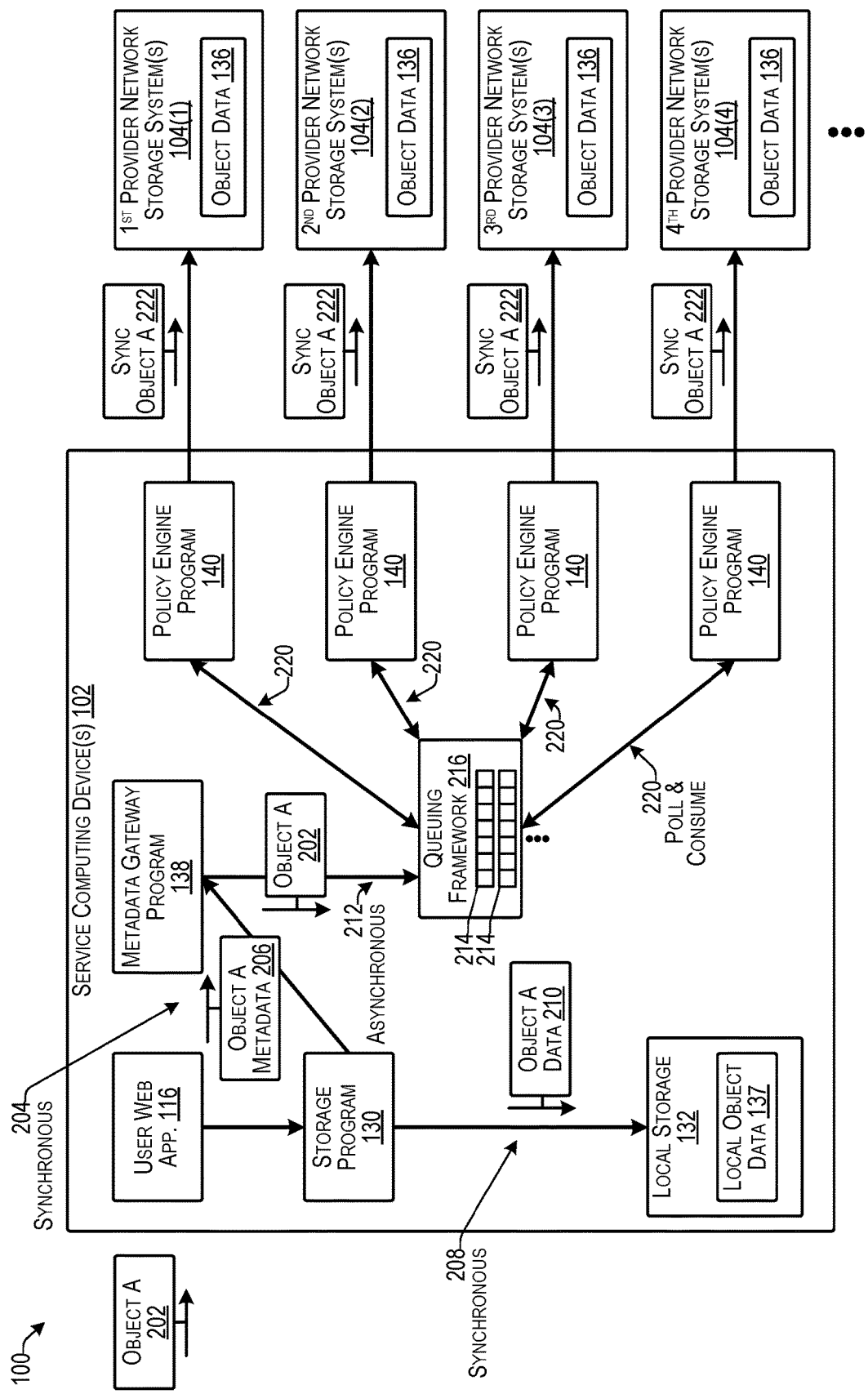
FIG. 2 is a block diagram illustrating an example logical configuration for performing sync-to in the system according to some implementations.

FIG. 2 is a block diagram illustrating an example logical configuration for performing sync-to in the system 100 according to some implementations. In some examples, the system 100 may correspond to the system 100 discussed above or any of various other possible computing system architectures, as will be apparent to those of skill in the art having the benefit of the disclosure herein. The system 100 may enable distributed object storage and may include the use of web applications as a front end for users and administrators. In some cases, the system 100 may store objects on the network storage systems 104 in buckets that may be created by the users and/or administrators. The system 100 may enable complex management and storage of data using resources distributed across local and cloud systems.

In implementations herein, the synchronization process may be performed using two steps, e.g., sync-to the network storage systems 104 and sync-from the network storage systems 104. For instance, dividing the data synchronization process into a two-step process based on direction enables implementations herein to provide multi-sync and multi-target support, and further, may provide the ability to configure combinations of those steps. Further, some implementations herein include a two-stage asynchronous event-driven execution framework for multi-target replication to the plurality of network storage systems 104.

FIG. 2 illustrates elements of an example of synchronizing data to the network storage systems 104, and includes an overview of the flow of data replication as part of the sync-to direction. Some examples herein may be based at least in part on executing micro services running in containers that are able to function as independent compute engines. For instance, multiple instances or containers of each of the services, e.g., the storage program 130, the metadata gateway program 138 and/or the policy engine program 140 may be executed across a distributed cluster, e.g., in multiple ones of the service computing devices 102. The multiple micro service instances may enable scaling of the policy engine across the distributed cluster or other distributed computing architecture, such as may be needed due to disparate application workloads.

As an example, on ingest of data from an application (e.g., via the user web application 116 or the management web application 124), in real-time two synchronous actions are performed. For example, suppose that a user has saved object A 202 via the user web application 116. First, as indicated at 204 object metadata 206 may be created for object A that includes information such as object name as input by the application, a version ID, a timestamp, object size, user metadata tags, an access control list, and the like. Additionally, also synchronously as indicated at 208, object data 210 of the object A is stored to the local storage 132 as part of the local object data 137, and a stored object locator ID is added to the other system metadata as part of the object a metadata 206. The metadata gateway program 138 may add the object A metadata 206 to the metadata database 134 (not shown in FIG. 2). Because these two actions are performed in real time, the storage program 130 may return a response to the user indicating that the storage of the object A 202 has been successfully completed.

As indicated at 212, the metadata gateway program 138 may subsequently asynchronously generate a synchronization event for object A 202, and may add the synchronization event to one or more queues 214 in a message queuing framework 216 provided by the message queuing program 142 discussed above. For example, similar to the rest of the micro services herein, the queue(s) 214 may be scaled up or down independent of the other services. For example, as provided by the message queuing framework 216, the queue(s) 214 may be both stateful and durable. For example, if one queue 214 becomes corrupted or goes out of service, one or more configurable redundant copies of the events in the queue 214 may be maintained across at least one other queue 214 for recovery on failure. The event driven messaging queue framework 216 reduces traffic on the metadata gateway program 138, which is executed for performing metadata storage and retrieval so that that metadata gateway program 138 does not get flooded with queries for performing synchronization. Moreover, the queuing framework can also help segregate mirroring events from all other synchronization events in the system.

The policy engine program 140 may be executed to provide a set of containerized services that operate in the background to poll and consume events from the queue 214 for each synchronization target, as indicated at 220. For example, the policy engine program 140 may pull synchronization events off the queue 214 asynchronously and may synchronize the events in the queue 214 to respective ones of the network storage systems 104. For example, each synchronization event may have a separate target based on a particular one of the network storage systems 104, and a named bucket therein. Accordingly, based on techniques discussed additionally below, the policy engine program 140 may sync object A, as indicated at 222, including metadata of object A in some cases, to the intended synchronization targets, which in this example may include network storage systems 104(1)-104(4), each of which may be provided by a different service provider having different storage configurations, protocols and the like.

In some implementations, the synchronization events that are outgoing (i.e., sync-to events) may be separated into one or more outgoing queues and the synchronizing events for retrieving data from the network storage systems 104 (i.e., sync-from events) may be separated into one or more sync-from queues. The segregation of communication by direction using separate queues 214 may help ensure that if one of the network storage systems 104 is malfunctioning or if there are network connectivity issues, communication to others of the network storage systems 104 that are functioning properly are not affected. Given that the network storage systems 104 are provided by multiple different service providers, the system 100 may not be able to easily distinguish between a network storage system 104 being temporarily down or completely out of commission. Also, it may not be practical to rely on a particular network storage system 104 to providing accurate reasons for an error or failures due to, e.g., resource or quota limitations, a server undergoing maintenance, or a bug in the system.

In addition, some examples herein may include segregating synchronization events based on categories. For example, the queuing framework 216 may include separate sets of queues 214 (e.g., a sync-to queue and a sync-from queue) for each separate remote target domain, e.g., the queuing framework 216 may include a first set of queues 214 for the first provider network storage system(s) 104(1), a second set of queues 214 for the second provider network storage system(s) 104(2), a third set of queues 214 for the third provider network storage system(s) 104(3), and so forth. Thus, the policy engine program 140 may execute a one-to-many synchronization of data from the service computing device(s) 102 to the network storage systems 104.

Further, in some cases, the policy engine program 140 may apply one or more filters to the synchronization events in the queues 214. For example, the policy engine program may be configurable by the users to apply a user specified rules that may include filtering certain objects based on object tags associated with the objects. Based on these user specified rules, the policy engine program 140 may consume a synchronization event from one of the queues 214, compare any metadata tags included with the data that is a target of the synchronization event, and if the metadata tag matches a specified rule the synchronization event may be discarded by the policy engine program 140 rather than the synchronization event being performed.

Furthermore, in some examples, when the policy engine program 140 consumes a synchronization event from one of the queues 214, the policy engine program may first determine which buckets on which network storage systems 104 are the target of the synchronization event. After determining the target buckets and the target network storage system(s) 104, the policy engine program 140 may access the authentication credentials for making an access call to the target network storage system(s) 104. Following authentication, the policy engine program 140 may access the target network storage system(s) 104, such as using provider-specific protocols and procedures corresponding to the target network storage system(s) 104.

Figure 3:
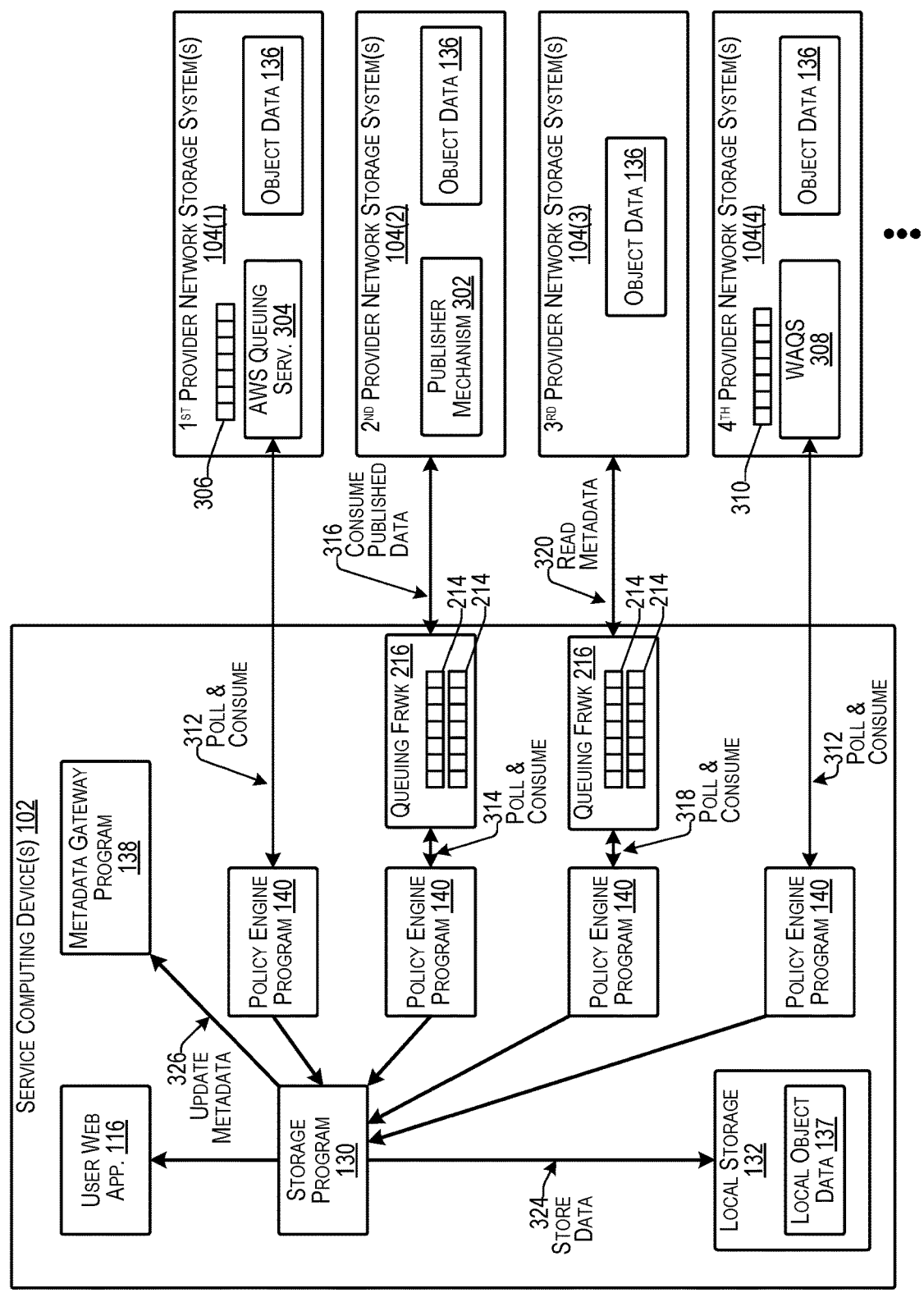
FIG. 3 is a block diagram illustrating an example of performing sync-from synchronization in the system according to some implementations.

FIG. 3 is a block diagram illustrating an example of performing sync-from synchronization in the system 100 according to some implementations. For example, the synchronization events may include retrieving data from the network storage systems 104 that are hosted by the various different service providers. Configuring sync-from can allow restoration of remotely-stored data to the system 100, e.g., to the local storage 132 and/or to a client device, such as the user device 108 or the administrator device 110. In the system 100, the policy engine program 140 may act as a set of consumers that process synchronization events by pulling the events off the queuing framework 216. One reason for treating sync-from events separately from the sync-to events is to support network storage systems 104 that do not offer the same type of consumption services others of the network storage systems 104. For example, some network storage systems 104, such as the second provider network storage system(s) 104(2) in the illustrated example may offer a publisher mechanism 302, such that when objects are dropped into buckets in the second provider network storage system(s) 104(2) the objects may include a set of producers that may provide notifications of changes to the data buckets.

Other network storage systems 104 may provide a queued notification system where new changes are sent to a queue and can be queried through a queue. Further, other network storage systems 104 may incorporate an entirely different method and may not offer any notification or event consumption mechanism. Accordingly, implementations herein are able to replicate back from any type of network storage systems 104, whether there is no event notification, or whether there are any of various different techniques employed for different notification models.

In some examples, the system may actively look for new data on the network storage systems 104 for performing a mirror-back operation. Thus, data on the network storage systems 104 may be replicated back to the local system 100 using the sync-from function herein, such as by directly accessing queues provided by some of the network storage systems, or alternatively, based on receiving messages that may be added to a local sync-from queue provided by the queuing framework 216.

The event-driven queuing and notification consumption framework discussed above with the policy engine program 140 pulling synchronization events off queues 214 in the queuing framework 216 may be used in this example as well. For example, the remote notification differences may be abstracted away using the internal queuing framework 216. In the event that the network storage systems 104 provide their own queuing framework, some implementations herein may use the queuing framework directly provided by the service providers to avoid introducing any additional latency that might be added by an additional local queuing framework 216. In the case where the remote systems do not offer any notification services, some examples herein may use a thread that lists remote user data entries from data buckets and creates the entries in the producer queues.

In the illustrated example, suppose that the first provider network storage system(s) 104(1) is AMAZON WEB SERVICES (AWS) and that this provider includes an AWS queuing service 304 (also referred to as "Simple Queuing Service" (SQS)) that provides a queue 306. The queue 306 may be a scalable hosted queue for storing messages as they travel between computers, such as for moving data between distributed components of a system without losing messages or requiring each component to be always available. In addition, in the illustrated example, suppose that the fourth provider network storage system(s) 104(4) is a MICROSOFT WINDOWS AZURE system that provides a WINDOWS AZURE Queuing Service (WAQS) 308 that provides a queue 310 that may provide reliable, persistent messaging between applications or the like. For instance, the queue 310 may be used to transfer messages between applications or services.

As mentioned above, in the examples herein the policy engine program 140 may use the queues 306 and 310 directly to retrieve data from the network storage systems 104(1) and 104(4), respectively. For instance, as indicated at 312, the policy engine program 140 may poll and consume directly from the queues 306 and 310. On the other hand, with respect to the second provider network storage system 104(2), as this system uses a publisher mechanism 302, as indicated at 314, the policy engine program 140 polls and consumes from a queue 214 in the queuing framework 216 that includes sync-from events to enable the policy engine program 142 consume published data published by the publisher mechanism 302 as indicated at 316. Similarly, with respect to the third provider network storage system(s) 104(3), suppose that this storage system includes metadata, and as indicated at 318, the policy engine program 140 polls and consumes from a queue 214 in the queuing framework 216 to read metadata as indicated at 320.

Data received by the policy engine 140 may be stored to the local storage 132 as indicated at 324. Furthermore, the metadata gateway program 138 may update metadata in the metadata database as indicated at 326. Thus, the sync-from operations may be one-to-one or many-to-one. Any object added to a bucket on one of the network storage systems 104 can be retrieved according to the implementations herein.

FIG. 4 is a diagram illustrating an example of pseudocode 400 according to some implementations. In some examples herein, an administrator in the system 100 may be able to configure replication settings and other synchronization settings in the policy engine program 140. For example, the administrator may enable or disable remote replication targets and setup security measures, such as by allowing communications to flow through a proxy host so that proper security measures can be applied by the organization at the proxy host before data leaves the local system 100.

In this example, as indicated at 402, the administrator may also limit the destinations to which data is being replicated. Information such as provider type may be stored to be able to understand the type of communication that is possible with each service provider, such as whether notifications can be targeted to that destination or whether the particular provider's network storage system 104 allows any additional metadata requests, or the like.

FIG. 5 is a diagram illustrating example of pseudocode 500 according to some implementations. In this example, the synchronization rules for the policy engine program 140 may be established by the application users that ingest data into the system. For example, as indicated at 502, the name of a bucket and service provider may be specified for sync-from. Further, as indicated at 504, the name of the bucket and the service provider may also be specified for sync-to.

FIG. 6 illustrates an example data structure 600 for local system object versions according to some implementations. For example, object versioning may be enabled by users while defining sync-to or sync-from replication rules to help manage conflicts between source and destination targets. Other advantages of object versioning may include enabling support for single instancing or limiting copies of data when content is not changed. In this example, the data structure 600 includes information for local system object versions including a version ID 602, a content hash 604, a size 606 of the object, a replication state 608 of the object, and an updated time 610. For example, the content hash 604 may be determined using any suitable low-collision hashing function on a least a portion of the object data and/or metadata for each object. Examples of hashing functions include SHA-1, SHA-256, MD5, FarmHash Fingerprint64, and so forth.

As an example of a specific use case, a user might create identical copies of previously ingested objects for storing into the same bucket. This might be done to change the object metadata on the network storage system 104 to indicate that the object is still hot so that the object does not become a target for tiering to a colder storage, for instance, on the remote system. Another reason to create identical copies may be for supporting different access permissions, e.g., creating read/write permission on one object version and read-only permission on another version of the object.

Thus, versioning may allow the system to provide a finer level of control to users. Object versions may be propagated, e.g., each version may be replicated to one or more of the network storage systems 104. In some cases, if the system herein determines that identical content has already been replicated to the network storage system, then a link to the original version that includes the same content may be created, if the remote system allows this, instead of re-propagating the same content again.

FIG. 7 illustrates an example data structure 700 for network storage system object versions according to some implementations. In this example, the data structure includes a version ID 702, metadata tag 704, content size 706, storage size 708, and timestamp 710. As mentioned above, the remote system object version data structure 700 may be used for determining whether other versions of an object exist on a remote network storage system 104 to which the data structure pertains. Furthermore, as discussed below, the metadata tag 704 may actually correspond to the content hash for the particular object.

In some examples, because the version IDs 602 and 702 on the data structures 600 and 700, respectively, are controlled by different systems (i.e., local and remote), the version IDs 602 and 702 for the particular object versions may not match. However, the content hash and size on both systems, if the same versions are maintained, would be the same. In addition, some examples herein may use the S3 protocol, which supports creating metadata tags for object versions. For example, since not all network storage systems 104 may support retrieval of the content hash, the content hash can be added to the remotely stored object as a metadata tag, which can further be used for comparison when determining whether the same version of a particular object is already present. The state of the object versions on the local system may be maintained to prevent re-replication from occurring. If a new version of an object that has a matching content hash and size is already present in the local storage system and is re-ingested by a user, e.g., as indicated at 612 in FIG. 6, then instead of replicating the same version of the object to the network storage system more than once, only a link to the object is replicated, as indicated at 712 in FIG. 7, and the content is not re-transmitted. For example, the link may point to the version of the content that already exists on the network storage system.

Figure 8:
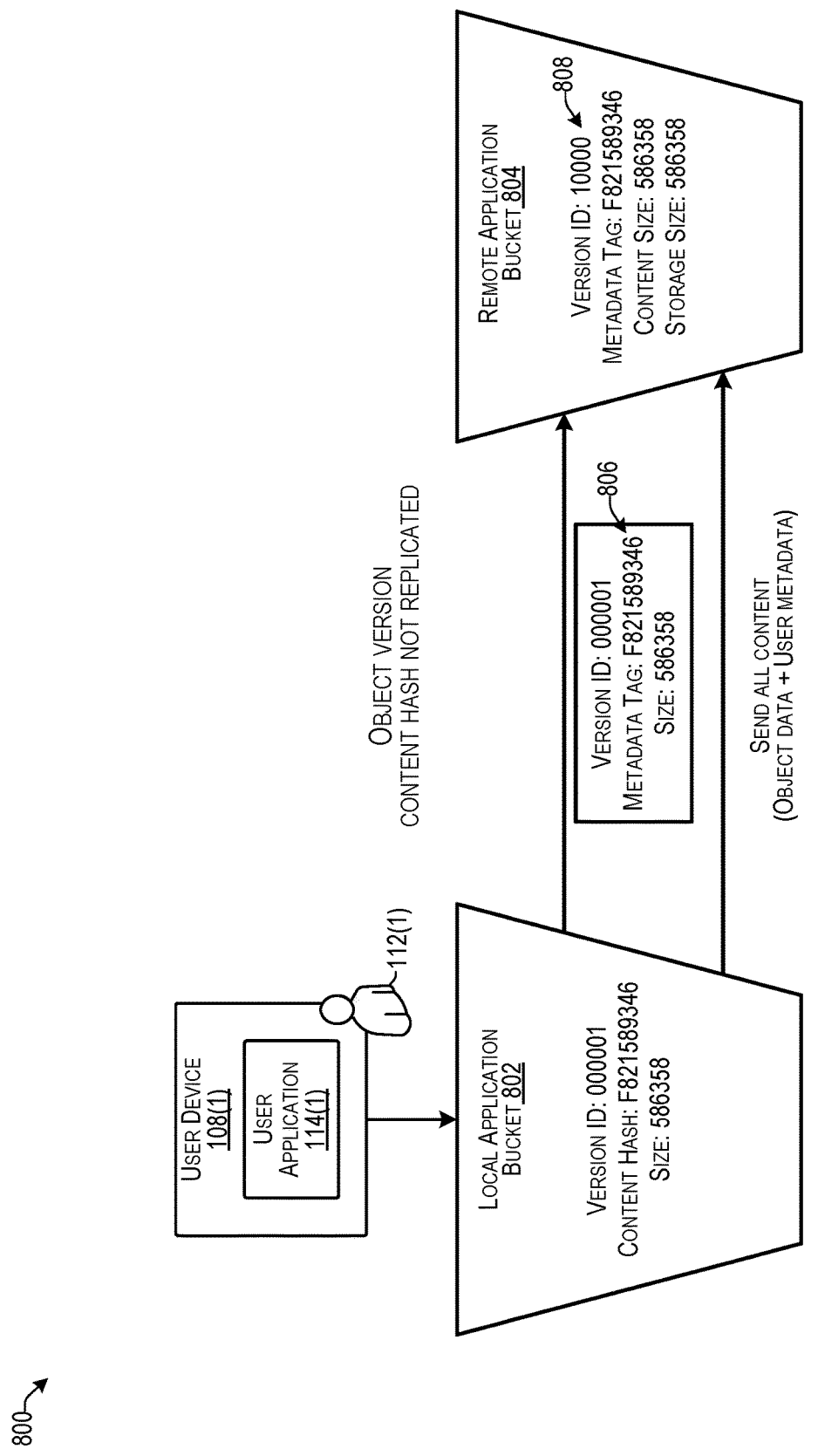
FIG. 8 illustrates an example of versioning replication according to some implementations.

FIG. 8 illustrates an example 800 of versioning replication according to some implementations. For example, suppose that a first user 112(1) of a first user device 108(1) uses a user application 114(1) to generate and store objects to the system 100 discussed above. Further, suppose that the first user 112(1) configures a local application bucket 802 in the local storage 132 and a remote application bucket 804 for receiving replication of the user's objects on one or more of the network storage systems 104.

When the policy engine program 140 replicates the object from the local application bucket 802 to the remote application bucket 804, the policy engine program 140 may add a metadata tag to the metadata for the object being replicated. As indicated at 806, the metadata tag may include the content hash previously determined for the object in the local application bucket 802. Thus, during the replication, the policy engine program 140 may send all content of the object including the object data and the user metadata to the network storage device for storage in the remote application bucket 804. As indicated at 808, the network storage system may assign its own version ID to the replicated object stored in the remote application bucket 804.

Figure 9:
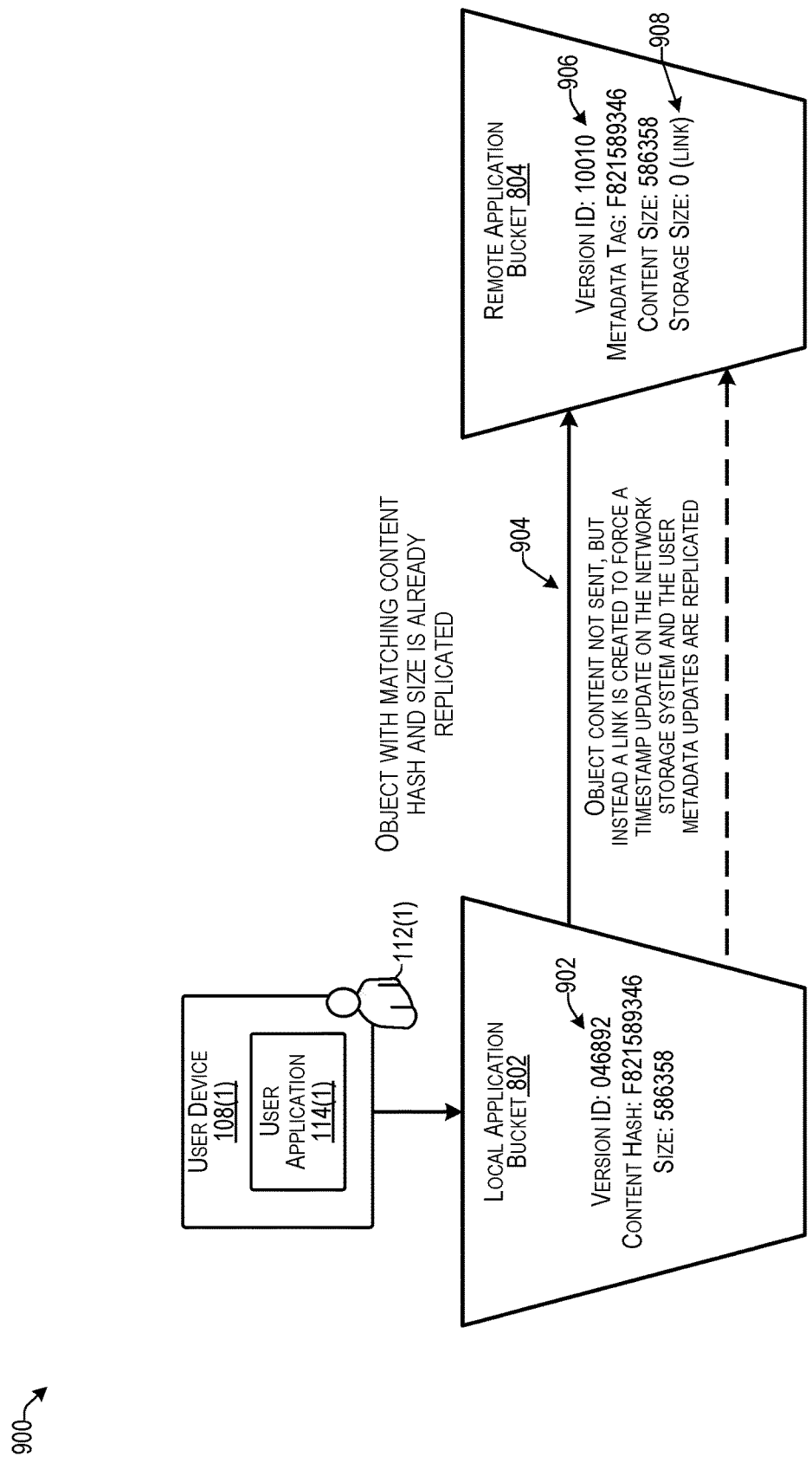
FIG. 9 illustrates an example of versioning replication according to some implementations.

FIG. 9 illustrates an example 900 of versioning replication according to some implementations. In this example, suppose that the first user 112(1) re-ingests a copy of the same object to the local application bucket 802. The local system will assign a new version ID, as indicated at 902, and update the time stamp for the object in the data structure 600, but the content hash and the size are the same as the previously ingested object of FIG. 8. When the new version of the object is replicated, then as indicated at 904, the object content is not sent but instead a link is created to force a timestamp update on the network storage system, and the user metadata updates are also replicated. Accordingly, when the new version of the object is added to the remote application bucket 804, a new version ID is assigned, as indicated at 906, and the storage size is indicated to be zero due to the link, as indicated at 908.

Figure 10:
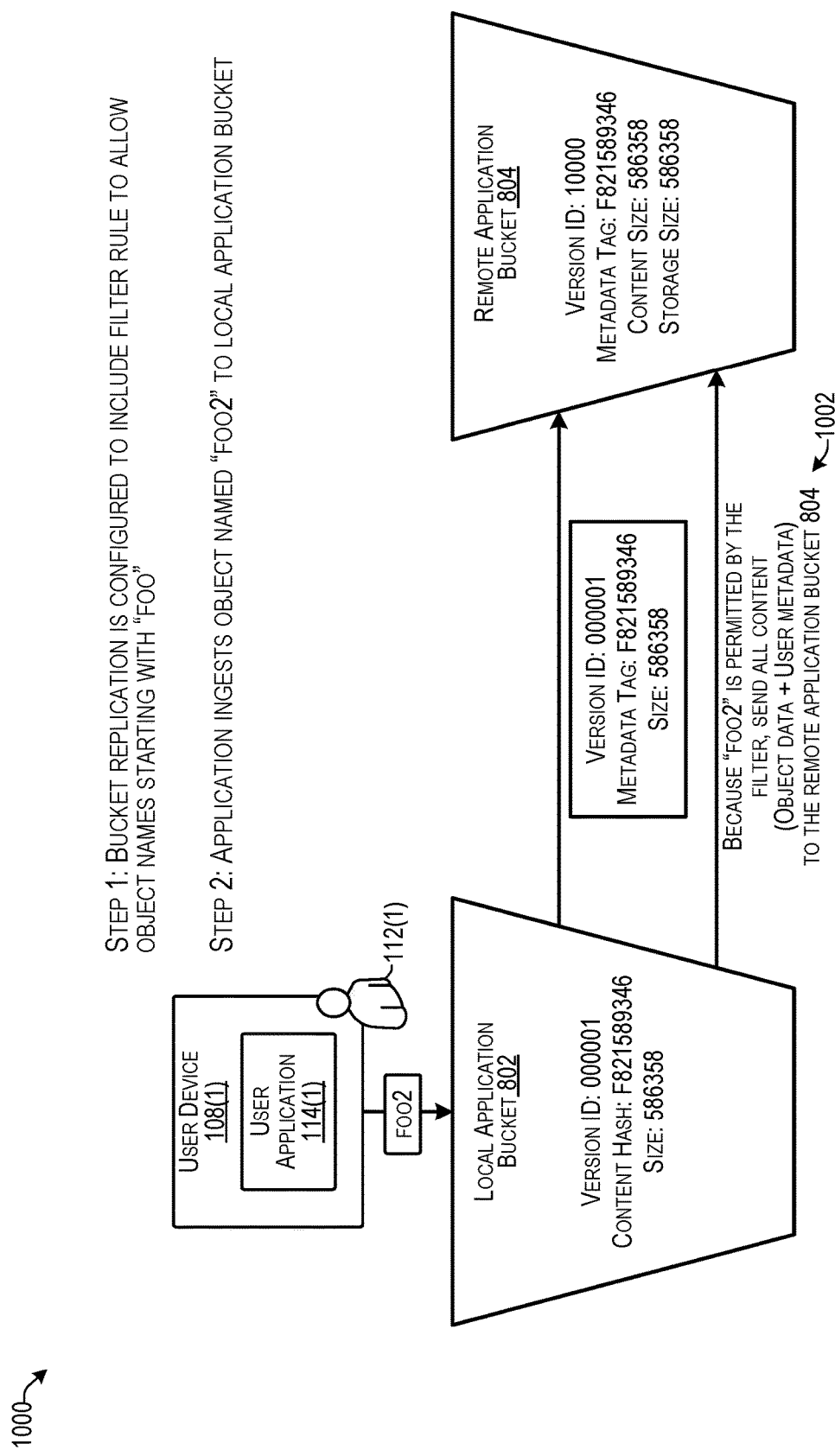
FIG. 10 illustrates an example of applying filters to bucket replication according to some implementations.

FIG. 10 illustrates an example 1000 of applying filters to bucket replication according to some implementations. For example, as mentioned above, filters may be implemented by users on buckets to be applied during synchronization by the policy engine program 140 to object names, metadata tags, or based on various other metadata.

In this example, suppose that an operator, such as the user or an administrator, configures bucket replication to include a filter rule to allow objects with names starting with "foo" to be replicated. Subsequently, suppose that the user application 114(1) ingests an object named foo2 to the local application bucket 802. The object foo2 is stored to the local application bucket 802. The policy engine program 140 may then replicate all content of the object to the remote application bucket 804 because foo2 is permitted by the filter that is in place on the replication to the remote application bucket 804.

Figure 11:
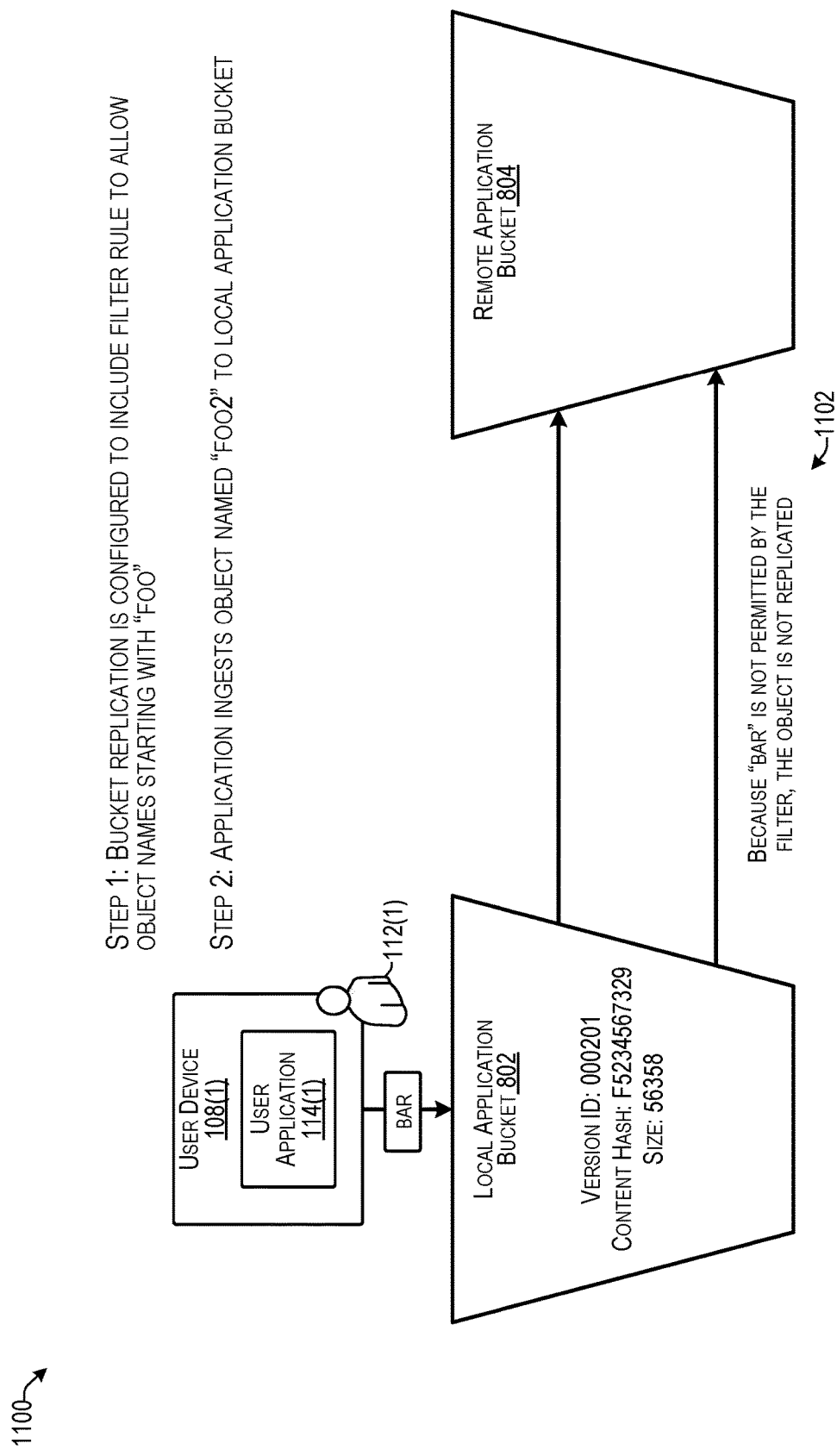
FIG. 11 illustrates an example of applying filters to bucket replication according to some implementations.

FIG. 11 illustrates an example 1100 of applying filters to bucket replication according to some implementations. In the example, of FIG. 10 discussed above, suppose that the user 112(1) uses the application 114(1) to ingest an object having object name "bar" to the local application bucket 802. Prior to replicating the object to the remote application bucket 804, the policy engine will check the filter and determine that bar is not allowed to be replicated based on the filter. Accordingly, as indicated at 1102, because bar is not permitted by the filter, the object is not replicated to the remote application bucket 804.

Figure 12:
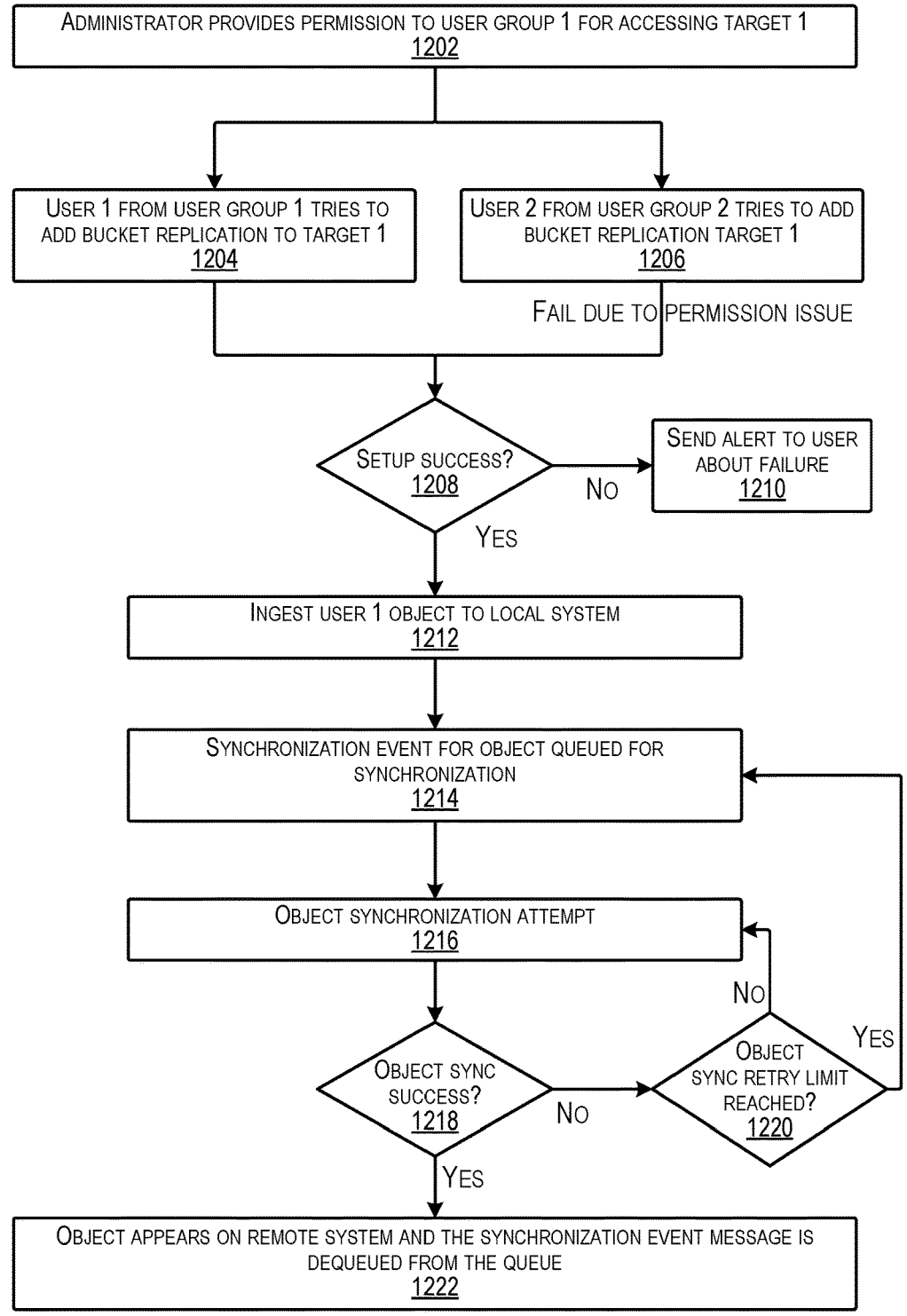
FIG. 12 illustrates a flow diagram of a sync-to process according to some implementations.
Figure 13:
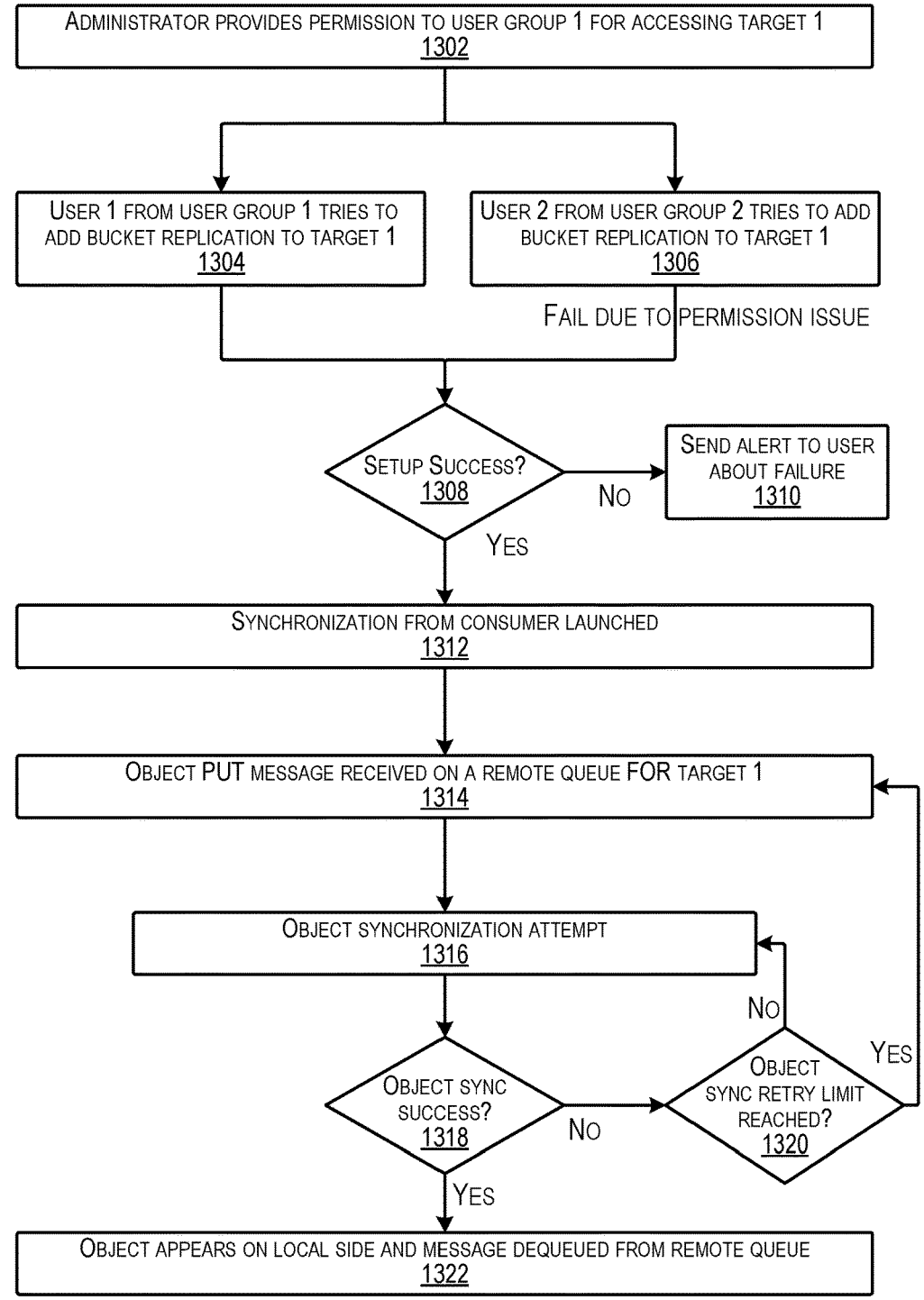
FIG. 13 illustrates a flow diagram of a sync-from process according to some implementations.

FIGS. 12 and 13 are flow diagrams illustrating example processes for routing metadata requests according to some implementations. The process is illustrated as a collection of blocks in a logical flow diagram, which represents a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the process is described with reference to the environments, frameworks, and systems described in the examples herein, although the process may be implemented in a wide variety of other environments, frameworks, and systems.

FIG. 12 illustrates a flow diagram of a sync-to process 1200 according to some implementations. In the example of FIG. 12, the process 1200 may be executed at least in part by the one or more service computing devices 102 executing the storage program 130, the metadata gateway program 138, and/or the policy engine program 140.

At 1202, an administrator may provide permission to a user group 1 for accessing a target one. For example, the target one may be a network storage system 104, as discussed above.

At 1204, user 1 from user group 1 tries to add bucket replication to target 1.

At 1206, user 2 from user group 2 tries to add bucket replication to target 1. This effort fails however because user 2 belongs the user group 2 instead of user group 1, and is therefore not able to set up replication to target 1.

At 1208, the system determines whether the setup of replication was successful. If so, the process goes to 1212. If not, the process goes to 1210.

At 1210, if the setup of replication was not successful, the system may send an alert to the user about the failure.

At 1212, if the setup of replication was successful, user 1 may ingest an object into the local system, such as into a local bucket.

At 1214, following ingestion of the object into the local system, a synchronization event is queued for synchronization of the object to target 1.

At 1216, the system may attempt to synchronize the object to the remote bucket on target 1.

At 1218, the system may determine whether the object synchronization was successful. If so, the process goes to 1222. If not, the process goes to 1220.

At 1220, if the synchronization was not successful, the system determines whether the object sync retry limit has been reached. If so, then the system returns to 1214 and queues another synchronization event for the object. On the other hand, if the retry limit has not yet been reached, the process goes to 1216 and the system makes another object synchronization attempt to target 1.

At 1222, if the object synchronization is successful, then the object appears on the remote system and the synchronization event message is dequeued from the queue.

FIG. 13 illustrates a flow diagram of a sync-from process 1300 according to some implementations. In the example of FIG. 13, the process 1300 may be executed at least in part by the one or more service computing devices 102 executing the storage program 130, the metadata gateway program 138, and/or the policy engine program 140.

At 1302, an administrator may provide permission to a user group 1 for accessing a target one. For example, the target one may be a network storage system 104, as discussed above.

At 1304, user 1 from user group 1 tries to add bucket replication to target 1.

At 1306, user 2 from user group 2 tries to add bucket replication to target 1. This effort fails however because user 2 belongs the user group 2 instead of user group 1, and is therefore not able to set up replication to target 1.

At 1308, the system determines whether the setup of replication was successful. If so, the process goes to 1312. If not, the process goes to 1310.

At 1310, if the setup of replication was not successful, the system may send an alert to the user about the failure.

At 1312, if the setup of replication was successful, subsequently, a synchronization from a consumer may be launched with respect to an object.

At 1314, an object put message may be received on a remote queue corresponding to the target 1.

At 1316, an object synchronization attempt may be made.

At 1318, the system may determine whether the object synchronization was successful. If so, the process goes to 1322. If not, the process goes to 1320.

At 1320, if the synchronization was not successful, the system determines whether the object sync retry limit has been reached. If so, then the system returns to 1314 and queues another object put message on the remote queue. On the other hand, if the retry limit has not yet been reached, the process goes to 1316 and the system makes another object synchronization attempt.

At 1322, if the object synchronization is successful, then the object appears on the local system and the synchronization event message is dequeued from the remote queue.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 14:
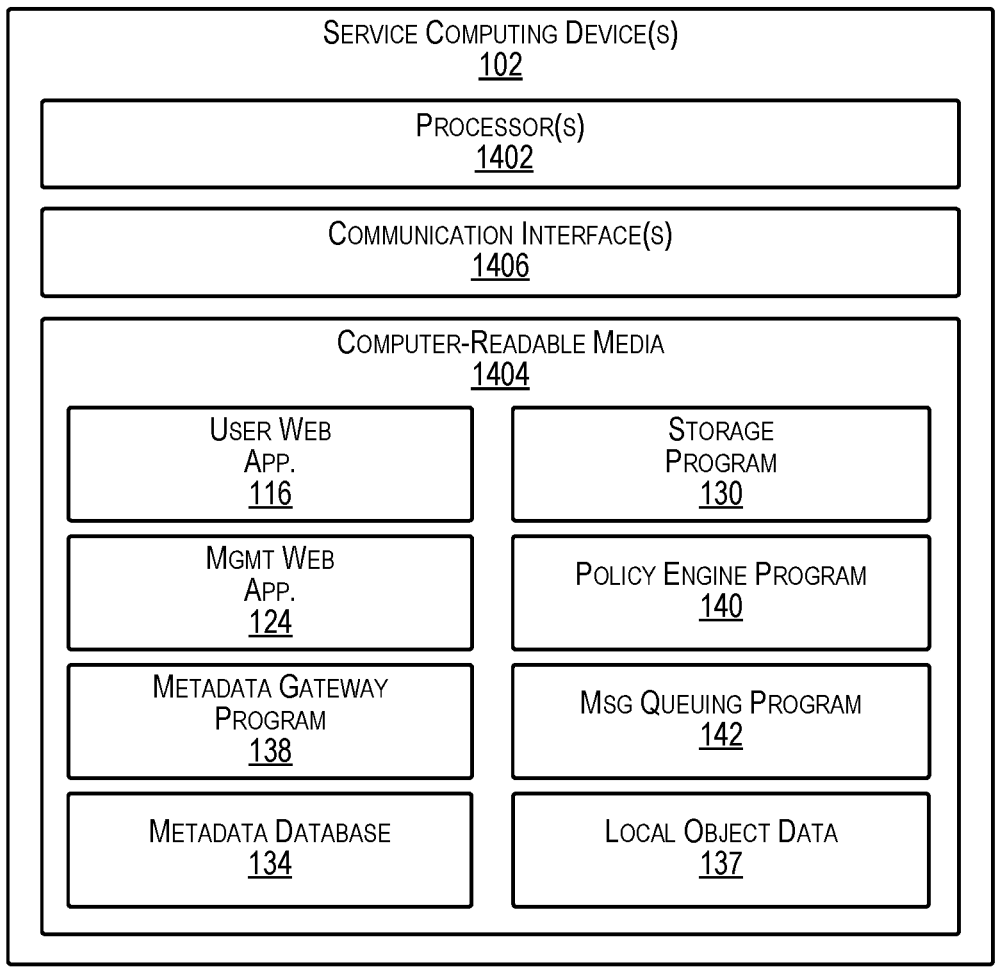
FIG. 14 illustrates select example components of the service computing device(s) that may be used to implement at least some of the functionality of the systems described herein.

FIG. 14 illustrates select example components of the service computing device(s) 102 that may be used to implement at least some of the functionality of the systems described herein. The service computing device(s) 102 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used. Multiple service computing device(s) 102 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, the service computing device(s) 102 includes, or may have associated therewith, one or more processors 1402, one or more computer-readable media 1404, and one or more communication interfaces 1406. Each processor 1402 may be a single processing unit or a number of processing units, and may include single or multiple computing units, or multiple processing cores. The processor(s) 1402 can be implemented as one or more central processing units, microprocessors, microcomputers, microcontrollers, digital signal processors, state machines, logic circuitries, and/or any devices that manipulate signals based on operational instructions. As one example, the processor(s) 1402 may include one or more hardware processors and/or logic circuits of any suitable type specifically programmed or configured to execute the algorithms and processes described herein. The processor(s) 1402 may be configured to fetch and execute computer-readable instructions stored in the computer-readable media 1404, which may program the processor(s) 1402 to perform the functions described herein.

The computer-readable media 1404 may include volatile and nonvolatile memory and/or removable and non-removable media implemented in any type of technology for storage of information, such as computer-readable instructions, data structures, program modules, or other data. For example, the computer-readable media 1404 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device(s) 102, the computer-readable media 1404 may be a tangible non-transitory medium to the extent that, when mentioned, non-transitory computer-readable media exclude media such as energy, carrier signals, electromagnetic waves, and/or signals per se. In some cases, the computer-readable media 1404 may be at the same location as the service computing device 102, while in other examples, the computer-readable media 1404 may be partially remote from the service computing device 102. For instance, in some cases, the computer-readable media 1404 may include a portion of storage in the network storage system(s) 104 discussed above with respect to FIG. 1.

The computer-readable media 1404 may be used to store any number of functional components that are executable by the processor(s) 1402. In many implementations, these functional components comprise instructions or programs that are executable by the processor(s) 1402 and that, when executed, specifically program the processor(s) 1402 to perform the actions attributed herein to the service computing device 102. Functional components stored in the computer-readable media 1404 may include the user web application 116, the management web application 124, the storage program 130, the metadata gateway program 138, the policy engine program 140, and the message queuing program 142, each of which may include one or more computer programs, applications, executable code, or portions thereof. Further, while these programs are illustrated together in this example, during use, some or all of these programs may be executed on separate service computing devices 102.

In addition, the computer-readable media 1404 may store data, data structures, and other information used for performing the functions and services described herein. For example, the computer-readable media 1404 may store the metadata database 134 and the local object data 144. Further, while these data structures are illustrated together in this example, during use, some or all of these data structures may be stored on separate service computing devices 102. The service computing device 102 may also include or maintain other functional components and data, which may include programs, drivers, etc., and the data used or generated by the functional components. Further, the service computing device 102 may include many other logical, programmatic, and physical components, of which those described above are merely examples that are related to the discussion herein.

The one or more communication interfaces 1406 may include one or more software and hardware components for enabling communication with various other devices, such as over the one or more network(s) 106 and 107. For example, the communication interface(s) 1406 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

Various instructions, methods, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
a first computing device able to communicate with a plurality of network storage systems over a network, wherein a first network storage system is provided by a first service provider employing a first storage protocol and a second network storage system is provided by a second service provider employing a second storage protocol different from the first storage protocol, the first computing device configured by executable instructions to perform operations comprising:
receiving a first object at the first computing device;
determining, for the first object, a first remote bucket at the first network storage system and a second remote bucket at the second network storage system;
adding a synchronization event to a first queue for synchronizing the first object to the first remote bucket and to the second remote bucket; and
based on consuming the synchronization event from the first queue, replicating data and metadata of the first object to the first remote bucket and the second remote bucket.

2. The system as recited in claim 1, the operations further comprising:
generating a second queue, the second queue maintaining synchronization events for synchronizing data from the first network storage system and the second network storage system to the first computing device; and
maintaining, in the first queue, synchronization events for synchronizing data from the first computing device to the first network storage system and the second network storage system.

3. The system as recited in claim 2, the operating further comprising:
receiving a publication of an indication of data for synchronization at the first network storage system;
adding a synchronization event to the second queue based on the publication; and
replicating the data from the first network storage system based on the synchronization event in the second queue.

4. The system as recited in claim 2, wherein the second queue receives an indication of data for replication from the first network storage system as a synchronization event, the operations further comprising:
replicating the data from the first network storage system to a local storage at the first computing device.

5. The system as recited in claim 1, wherein the first network storage system generates a queue at the first network storage system, the operations further comprising:
consuming a synchronization event from the queue at the first network storage system; and
replicating data from the first network storage system to the first computing device based on the synchronization event.

6. The system as recited in claim 1, the operations further comprising:
determining a filter associated with at least one of the first remote bucket or the second remote bucket; and
replicating the data and metadata based on determining that the filter does not apply to the first object.

7. The system as recited in claim 6, wherein the filter is directed to at least one of an object name or object metadata for restricting replication to at least one of the first remote bucket or the second remote bucket.

8. The system as recited in claim 1, the operations further comprising:
receiving a second object at the first computing device;
determining that a size and a content hash associated with the second object match a size and a content hash associated with the first object; and
replicating metadata for the second object to the first remote bucket and the second remote bucket and indicating a link to the first object in place of content of the second object.

9. The system as recited in claim 1, the operations further comprising, based on determining the first remote bucket and the second remote bucket, providing first authentication credentials to the first network storage system and providing second authentication credentials to the second network storage system, wherein the first authentication credentials are different from the second authentication credentials.

10. The system as recited in claim 1, the operations further comprising executing a policy engine program on the first computing device, the policy engine program configuring the first computing device to:
consume the synchronization event from the first queue; and
determine a first storage protocol to use for replicating the first object to the first remote bucket and a second storage protocol to use for replicating the first object to the second remote bucket.

11. The system as recited in claim 1, the operations further comprising:
in response to receiving the first object, storing data of the first object in a local storage in real time;
sending a response in real time to a source of the first object; and
subsequently asynchronously replicating the first object to the first network storage system and the second network storage system.

12. A method comprising:
receiving, by a first computing device, a first object, the first computing device able to communicate with a plurality of network storage systems over a network, wherein a first network storage system is provided by a first service provider employing a first storage protocol and a second network storage system is provided by a second service provider employing a second storage protocol different from the first storage protocol;

determining, by the first computing device, for the first object, a first remote bucket at the first network storage system and a second remote bucket at the second network storage system;

adding, by the first computing device, a synchronization event to a first queue for replicating the first object to the first remote bucket and to the second remote bucket; and based on consuming the synchronization event from the first queue, replicating, by the first computing device, data and metadata of the first object to the first remote bucket and the second remote bucket.

13. The method as recited in claim 12, further comprising:

generating a second queue, the second queue maintaining synchronization events for synchronizing data from the first network storage system and the second network storage system to the first computing device; and maintaining, in the first queue, synchronization events for synchronizing data from the first computing device to the first network storage system and the second network storage system.

14. One or more non-transitory computer-readable media storing instructions that, when executed by one or more processors of a first computing device, configure the first computing device to perform operations comprising:

receiving, by the first computing device, a first object, the first computing device able to communicate with a plurality of network storage systems over a network, wherein a first network storage system is provided by a first service provider employing a first storage protocol and a second network storage system is provided by a second service provider employing a second storage protocol different from the first storage protocol;

determining, by the first computing device, for the first object, a first remote bucket at the first network storage system and a second remote bucket at the second network storage system;

adding, by the first computing device, a synchronization event to a first queue for replicating the first object to the first remote bucket and to the second remote bucket; and based on consuming the synchronization event from the first queue, replicating, by the first computing device, data and metadata of the first object to the first remote bucket and the second remote bucket.

15. The one or more non-transitory computer-readable media as recited in claim 14, the operations further comprising:

generating a second queue, the second queue maintaining synchronization events for synchronizing data from the first network storage system and the second network storage system to the first computing device; and maintaining, in the first queue, synchronization events for synchronizing data from the first computing device to the first network storage system and the second network storage system.

* * * * *